(12) United States Patent
Iwata et al.

(10) Patent No.: US 6,905,246 B2
(45) Date of Patent: Jun. 14, 2005

(54) DOUBLE-SIDED SLIDING THRUST BEARING

(75) Inventors: Hideki Iwata, Inuyama (JP); Takahiro Niwa, Inuyama (JP); Takeshi Shindo, Inuyama (JP); Kotaro Kashiyama, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 143 days.

(21) Appl. No.: 10/368,499

(22) Filed: Feb. 18, 2003

(65) Prior Publication Data

US 2003/0185475 A1 Oct. 2, 2003

(30) Foreign Application Priority Data

Mar. 26, 2002 (JP) .................................... 2002-086507

(51) Int. Cl.⁷ .................................................. F01B 3/00
(52) U.S. Cl. ........................................... 384/42; 92/71
(58) Field of Search ........................... 384/26, 42, 420, 384/276; 92/71; 417/269

(56) References Cited

U.S. PATENT DOCUMENTS

| | | | | |
|---|---|---|---|---|
| 4,862,789 A | * | 9/1989 | Burgess et al. | 384/42 |
| 5,598,920 A | | 2/1997 | Hansen | |
| 5,813,315 A | * | 9/1998 | Kristensen et al. | 92/71 |
| 5,890,412 A | * | 4/1999 | Martensen et al. | 92/71 |
| 6,189,434 B1 | * | 2/2001 | Kawaguchi et al. | 92/71 |
| 6,584,886 B2 | * | 7/2003 | Sugiura et al. | 92/71 |
| 2001/0015130 A1 | * | 8/2001 | Sugiura et al. | 92/71 |
| 2002/0104432 A1 | * | 8/2002 | Shimo et al. | 92/71 |

FOREIGN PATENT DOCUMENTS

| | | |
|---|---|---|
| GB | 2 313 632 A | 12/1997 |
| JP | 11230032 A | 8/1999 |
| JP | 11302487 A | 11/1999 |

OTHER PUBLICATIONS

Search Report.

* cited by examiner

*Primary Examiner*—Thomas R. Hannon
(74) *Attorney, Agent, or Firm*—Rader, Fishman & Grauer PLLC (57) ABSTRACT

There is provided a double-sided sliding thrust bearing of a plate shape adapted to be in sliding contact with a counterpart on each of both faces of the thrust bearing, comprising a bearing structure provided with a plate-shaped base member having an anchor effect on each of both faces thereof, and a sliding layer having a thickness not less than 30 $\mu$m on each of the faces of said base member which sliding layer is made of a thermosetting resin-containing material. By making the thickness of the sliding layer 10 not less than 30 $\mu$m, it becomes possible for the thrust bearing 1 to slide shoes for a longer time even when being used in a dry state and the sliding layer 10 comes to be hardly peeled off from the base member 2 because of the anchor effect of the base member 2. Further, the mechanical strength and thermal conductivity of the thrust bearing 1 can be improved by the base member 2 located between the sliding layers 10.

8 Claims, 7 Drawing Sheets

DOUBLE-SIDED SLIDING THRUST BEARING

CROSS-REFERENCE TO RELATED APPLICATIONS

This application claims priority based on Japanese Application No. 2002-086507, filed Mar. 26, 2002.

BACKGROUND OF THE INVENTION

The present invention relates to a thrust bearing having a sliding face on each of both sides thereof (which is hereinafter referred to as a double-sided sliding thrust bearing), which has a plate shape and both the faces of which are in sliding contact with counterparts.

As a bearing which is formed into a plate shape and both the faces of which are in sliding contact with counterparts, a double-sided sliding thrust bearing is known. This double-sided sliding thrust bearing is used as, for example, a swash plate of a swash plate type piston pump (variable type pump, and compressor etc.) and etc. In the swash plate type piston pump, a gas in a cylinder is compressed by a piston reciprocated in the cylinder while following the rotating swash plate, and the swash plate slides with respect to a shoe which is a counterpart interposed between the swash plate and the piston. The swash plate of the swash plate type piston pump is rotated at a high speed, and is also subjected to a high pressure by the shoe.

Conventionally, in the double-sided sliding thrust bearing used in an equipment such as a swash plate type compressor, a sliding layer with a thickness of about 2 to 20 $\mu$m is provided by coating one time or a plurality of times both faces of a base member with a synthetic resin, or the double-sided sliding thrust bearing itself is made of a simple substance of resin.

On the other hand, in the double-sided sliding thrust bearing, a lubricant is supplied onto the sliding faces thereof. In particular, in the swash plate type compressor etc., the mixture of a refrigerant and a refrigerator oil, which is the lubricant, (refrigerant/refrigerator-oil mixture) is supplied. The lubricant is supplied onto the sliding faces of the double-sided sliding thrust bearing, however, in the case of an equipment which is sometimes not used for a long period of time as in the case of a compressor for an air conditioner, the refrigerant/refrigerator oil mixture comes not to be present on the sliding faces of the double-sided sliding thrust bearing with the result that a dry state is caused. In the case where the compressor is started in this dry state, since a certain time comes to be necessary until the refrigerant/refrigerator-oil mixture is supplied onto the sliding faces, sliding occurs in the dry state during a period before the refrigerant/refrigerator oil mixture comes to be supplied with the result that seizure is apt to be caused due to a high load applied to the double-sided sliding thrust bearing. Therefore, a double-sided sliding thrust bearing is required to be able to slide counterparts for a long time without any occurrence of seizing even in the dry state before the refrigerant/refrigerator-oil mixture is supplied sufficiently.

SUMMARY OF THE INVENTION

In the case where the sliding layer is provided by coating one time or a plurality of times both faces of a base member with the synthetic resin as described above, a sliding layer with a sufficient thickness cannot be provided, and the base member comes to be exposed due to the wear of the sliding layer which is caused by the use thereof in the dry state for a short time, so that the seizure comes to occur. Also, even in another case where a thick sliding layer is provided by many coating operations, there occurs such a problem as it is impossible to obtain sufficient adhesion between the sliding layer and the base member, with the result that the sliding layer comes to be peeled off from the base member in a short time. Further, in the still another case where the double-sided sliding thrust bearing itself is made of a simple substance of resin, the thrust bearing does not have a sufficient mechanical strength, which causes such a problem as the thrust bearing cannot withstand a high load, with the result that it is broken or damaged and such another problem as a heat dissipating effect is insufficient because of the poor thermal conductivity of the resin, so that the temperature of sliding faces is apt to be raised.

The present invention has been achieved in view of the above situation, and the object of the invention is to provide a double-sided sliding thrust bearing which can slide counterparts even in a dry state for a long time and which has a sufficient mechanical strength and a high thermal conductivity.

According to the first aspect of the present invention, there is provided a double-sided sliding thrust bearing of a plate shape adapted to be in sliding contact with a counterpart on each of both faces of the thrust bearing, the double-sided sliding thrust bearing comprising a bearing structure provided with: a plate-shaped base member having an anchor effect on each of both faces thereof; and a sliding layer having a thickness not less than 30 $\mu$m on each of the faces of said base member which sliding layer is made of a thermosetting resin-containing material. According to this constitution in which the thickness of the sliding layer is made to be not less than 30 $\mu$m, it becomes possible for the double-sided sliding thrust bearing to slide the counterparts for a long time even in the case where the double-sided sliding thrust bearing is used in the dry state, and it becomes possible to produce the double-sided sliding thrust bearing in which the sliding layer is hardly peeled off from the base member because of the anchor effect of the base member. Also, the mechanical strength and thermal conductivity of the double-sided sliding thrust bearing can be improved by the base member located between the sliding layers. Therefore, the double-sided sliding thrust bearing can be used at a high load because of the high strength, and a temperature rise on sliding face can be minimized by a heat dissipating effect brought about by the high thermal conductivity of the base member.

According to the second aspect of the present invention, a double-sided sliding thrust bearing according to the first aspect of the invention is provided in which the anchor effect is brought about by concave portions provided in both faces of the base member. By this constitution, the base member having the anchor effect that makes the sliding layer hardly peeled off can be manufactured readily by merely providing the concave portions in both faces of the base member by pressing or other means. This anchor effect is brought about by the phenomenon that the sliding layer fits in the concave portions provided in both faces of the base member, whereby a resistance against stresses in the sliding direction is increased. The anchor effect makes the adhesion high between the base member and the sliding layer, so that it becomes difficult for the sliding layer to be peeled off from the base member.

According to the third aspect of the present invention, a double-sided sliding thrust bearing according to the first aspect of the invention is provided in which the anchor effect is brought about by a plurality of through holes provided at an equal interval concentrically about a center of the base member. By this constitution, the base member having the anchor effect that makes the sliding layer hardly peeled off can be manufactured readily by merely providing the through holes at positions distant from the center of the base member at an equal angular interval. This anchor effect is brought about by the fact that the sliding layers formed on both faces of the base member are connected to each other by the through holes provided in the base member. The anchor effect makes the adhesion high between the base member and the sliding layer, so that it becomes possible for the sliding layer to be hardly peeled off from the base member.

According to the fourth aspect of the present invention, a double-sided sliding thrust bearing according to the first aspect of the invention is provided in which the anchor effect is brought about by a porous layer provided on both faces of the base member. By this constitution, the base member having the anchor effect that makes the sliding layer hardly peeled off can be manufactured readily by merely providing the porous layer on both faces of the base member. This anchor effect is brought about by the fact that a thermosetting resin-containing material forming the sliding layer is impregnated in the porous layer provided on both faces of the base member. The anchor effect makes the adhesion high between the base member and the sliding layer, so that it becomes possible for the sliding layer to be hardly peeled off from the base member.

According to the fifth aspect of the present invention, a double-sided sliding thrust bearing according to the first aspect of the invention is provided in which the sliding layer is formed on each of both the faces of the base member by any one of compression molding, transfer molding, and injection molding. By this constitution, the sliding layer with a sufficient thickness can be provided, so that the double-sided sliding thrust bearing can be manufactured readily which can slide the counterparts for a longer time even when it is used in the dry state.

According to the sixth aspect of the present invention, a double-sided sliding thrust bearing is provided in which the thrust bearing is used as a swash plate provided in a swash plate type piston pump, the swash plate being rotated and acting as a sliding member so that a part of each of both faces of the swash plate is in sliding contact with a counterpart provided in the swash plate type piston pump. By this constitution, even when the double-sided sliding thrust bearing is used in a dry state, the counterparts can be slid for a longer time and it becomes possible to prevent the damage and breakage of base member and the temperature rise on sliding face from being caused. Therefore, the swash plate type piston pump can be used under the severe condition of no lubrication, a high speed, a high load and etc.

DETAILED DESCRIPTION OF THE PREFERRED EMBODIMENTS OF THE INVENTION

Figure 1A:
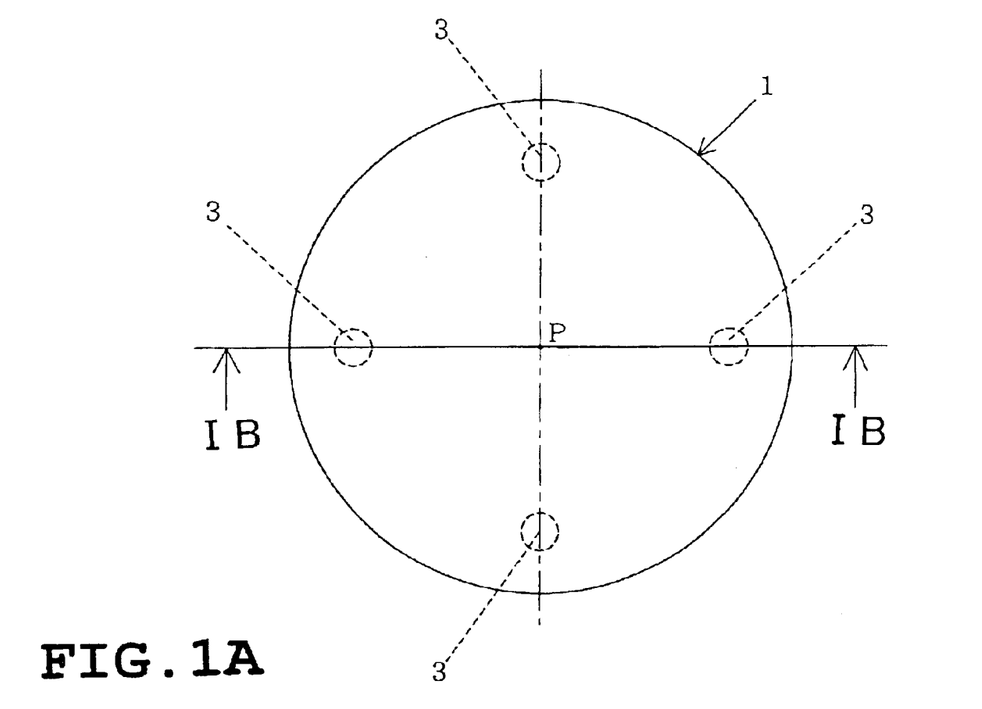
FIGS. 1A and 1B are a plan view and a longitudinal sectional view both schematically showing a double-sided sliding thrust bearing according to the first embodiment of the invention, respectively.
Figure 1B:
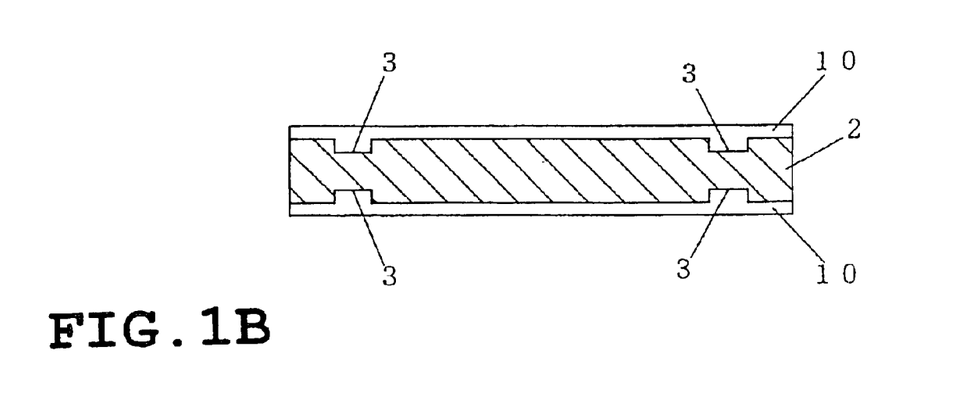
Figure 2A:
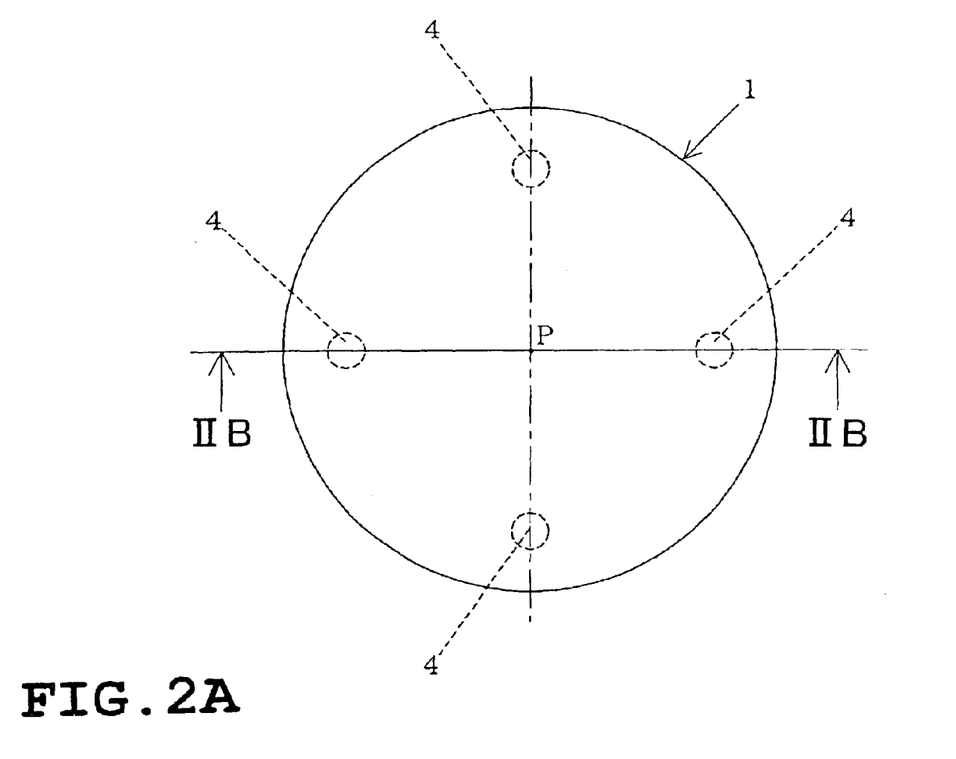
FIGS. 2A and 2B are a plan view and a longitudinal sectional view both schematically showing a double-sided sliding thrust bearing according to the second embodiment of the invention, respectively.
Figure 2B:
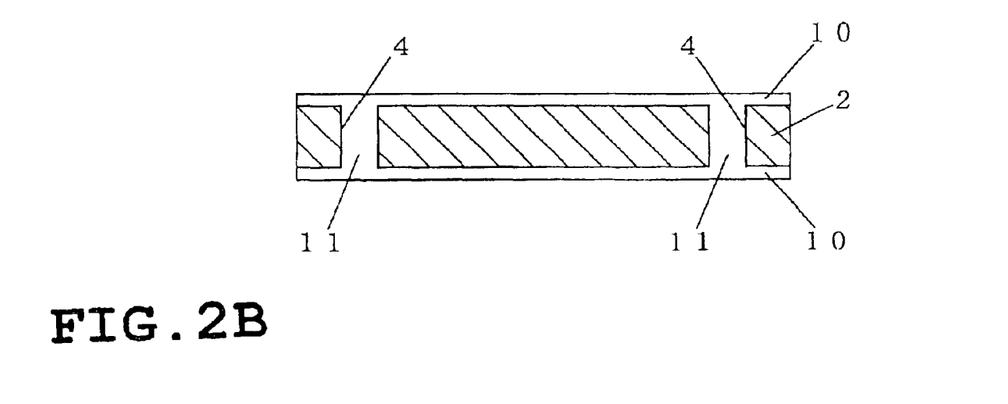
Figure 3A:
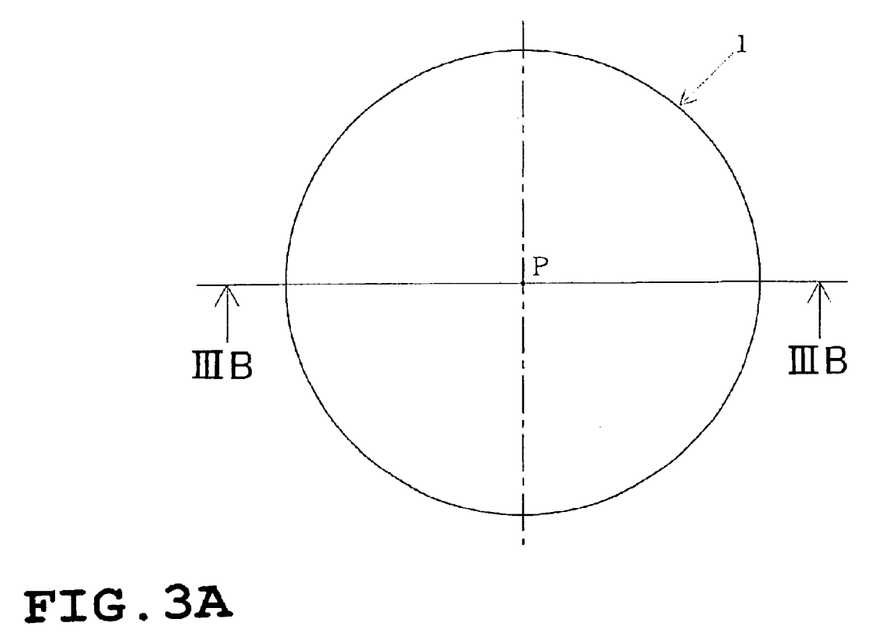
FIGS. 3A and 3B are a plan view and a longitudinal sectional view both schematically showing a double-sided sliding thrust bearing according to the third embodiment of the invention, respectively.
Figure 3B:
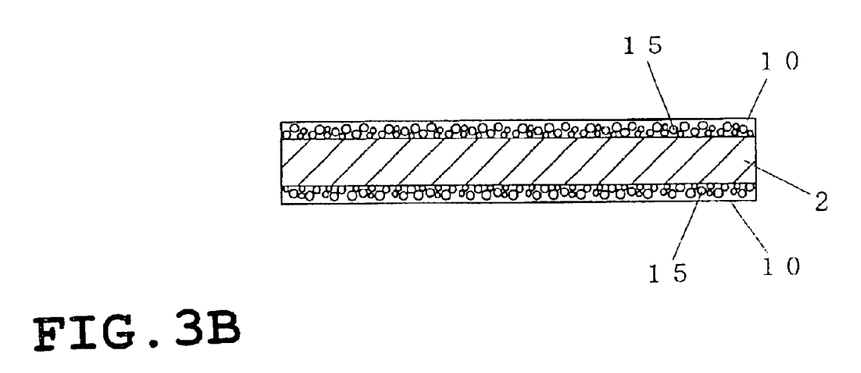

Preferred embodiments of the present invention are described below while referring to FIGS. 1 to 3. FIGS. 1A and 1B are a plan view and a longitudinal sectional view both schematically showing a double-sided sliding thrust bearing 1 according to the first embodiment, respectively. FIGS. 2A and 2B are a plan view and a longitudinal sectional view both schematically showing a double-sided sliding thrust bearing 1 according to the second embodiment, respectively. FIGS. 3A and 3B are a plan view and a longitudinal sectional view schematically both showing a double-sided sliding thrust bearing 1 according to the third embodiment, respectively. In each of the double-sided sliding thrust bearings 1 according to the first to third embodiments, the same reference numerals are applied to elements that have the same function.

The double-sided sliding thrust bearing 1 according to each of the first to third embodiments shown in FIGS. 1 to 3 is provided with: a plate-shaped base member 2 made of an iron-based simple substance of metal or alloy, a copper-based simple substance of metal or alloy, or an aluminum-based simple substance of metal or alloy; and a sliding layer 10 made of a thermosetting resin-containing material having a thickness not less than 30 $\mu$m which is provided on each of both the faces of the base member 2. Preferably, the thickness of this sliding layer 10 is not less than 30 $\mu$m but not more than 500 $\mu$m. This is because, if the thickness exceeds 500 $\mu$m, the thermal conductivity decreases with the results that a heat dissipating effect cannot be expected and that the temperature of the sliding face is apt to rise.

As the thermosetting resin which is the main constituent of the thermosetting resin-containing material, it is preferred to use one kind selected from the group consisting of phenolic resin, epoxy resin, polyamide-imide resin, and polyimide resin etc. In addition to these resins, it is possible to use one kind selected from the group consisting of unsaturated polyester resin, urea resin, melamine resin, silicon resin, alkyd resin, and urethane resin etc. In the thermosetting resin-containing material of which the sliding layer 10 is made, there are added at least one kind selected from the group consisting of: a solid lubricant such as graphite (Gr), molybdenum disulfide ($MoS_2$), and polytetrafluoroethylene (PTFE) etc. which solid lubricant acts to improve the friction characteristic; and an wear-resisting filler such as reinforced fiber and hard particles etc. which filler acts to improve the wear resistance. As regards the quantitative ratio of the constituents of the resin-containing material, the amounts of the thermosetting resin, the solid lubricant and the wear-resisting filler may be 30 to 90 mass %, 5 to 60 mass %, and 5 to 30 mass %, respectively.

In the base member 2 relating to the first embodiment shown in FIGS. 1A and 1B, a plurality of (four on one side in FIG. 1A) concave portions 3 are provided in each of both the faces thereof by pressing, cutting, or other means. By providing the concave portions 3 in this manner, the sliding layer 10 fits in the concave portions 3, so that a resistance to a stress in the sliding direction is increased, by which the anchor effect is brought about. Because of this anchor effect, an adhesion between the base member 2 and the sliding layer 10 is increased, so that the sliding layer 10 is hardly peeled off from the base member 2. Although in FIGS. 1A and 1B the concave portion 3 is made to have a cylindrical shape, the shape of the concave portion 3 is not limited to the cylindrical shape, and may be hemispherical, polyhedral and etc. Also, although in FIG. 1A four concave portions 3 are provided at an equal interval in a concentric circle on the surface of the base member 2, the number thereof is not limited to this, and a plurality of concave portions 3 may be provided at arbitrary positions. As the number of formed concave portions 3 increases, the resistance to the stress in the sliding direction increases, by which the anchor effect is increased.

In the base member 2 in the second embodiment shown in FIGS. 2A and 2B, a plurality of (four in FIG. 2) through holes 4 are provided at an equal interval in a concentric circle in the surface of the base member 2 by pressing, cutting, or other means. The center of this concentric circle is the center P of the base member 2. By providing the through holes 4 in this manner, the thermosetting resin-containing material is intruded, when the sliding layer 10 is provided on the base member 2, into the through holes 4 to thereby provide a connecting portion 11. Therefore, the sliding layers 10 provided on both the faces of the base member 2 are connected to each other by the connecting portion 11, which brings about the anchor effect. This anchor effect makes the sliding layer 10 hardly separated from the base member 2. The through holes 4 are provided at an equal interval concentrically about the center P of the base member 2 so that the anchor effect may be brought about uniformly over the whole surface of the sliding layer 10. Thus, the sliding layer 10 does not come to be peeled off locally. Although four through holes 4 are provided in FIG. 2A, the number thereof is not limited to this, and two or more through holes 4 may be provided. As the number of the through holes 4 increases, the anchor effect increases.

In the base member 2 in a third embodiment shown FIGS. 3A and 3B, a porous layer 15 is provided on each of both the faces of the base member 2. This porous layer 15 is provided by the steps of dispersing a copper alloy powder on each of both the faces of the base member 2 and sintering it. By providing the porous layer 15 in this manner, the thermosetting resin-containing material forming the sliding layer 10 is impregnated, when the sliding layer 10 is provided on the base member 2, in pores in the porous layer 15, which brings about the anchor effect. Therefore, an adhesion between the base member 2 and the sliding layer 10 is increased by this anchor effect, so that the sliding layer 10 is hardly peeled off from the base member 2.

In the above-described double-sided sliding thrust bearing 1 of each of the first to third embodiments, the sliding layer 10 is provided on each of both the faces of the base member 2 by use of any one of the compression molding, transfer molding and injection molding, so that the sliding layer 10 with a sufficient thickness can be provided. Thus, unlike the conventional case in which the base member is coated with the thermosetting resin-containing material to form the sliding layer, a phenomenon that the sliding layer is early worn out with the result that the base member comes to be exposed can be prevented for a long period of time. When the sliding layer of phenolic resin is provided by the above described compression molding, transfer molding, or injection molding, the molding is preferably performed under the molding conditions given in Table 1.

TABLE 1

| Molding Method | Molding Condition | Proper Range |
|---|---|---|
| Compression molding or transfer molding | Metal mold temperature (° C.) | 150 |
| | Molding pressure(MPa) | 15 to 19 |
| | Molding time (sec) | 200 to 300 |
| Injection molding | Cylinder temperature (front) (° C.) | 100 to 110 |
| | Cylinder temperature (back) (° C.) | 80 to 90 |
| | Rotation Speed of screw (rpm) | 50 to 60 |
| | Injection pressure (MPa) | 100 to 150 |
| | Metal mold temperature (° C.) | 170 to 180 |
| | Molding time (sec) | 60 to 120 |

Figure 4:
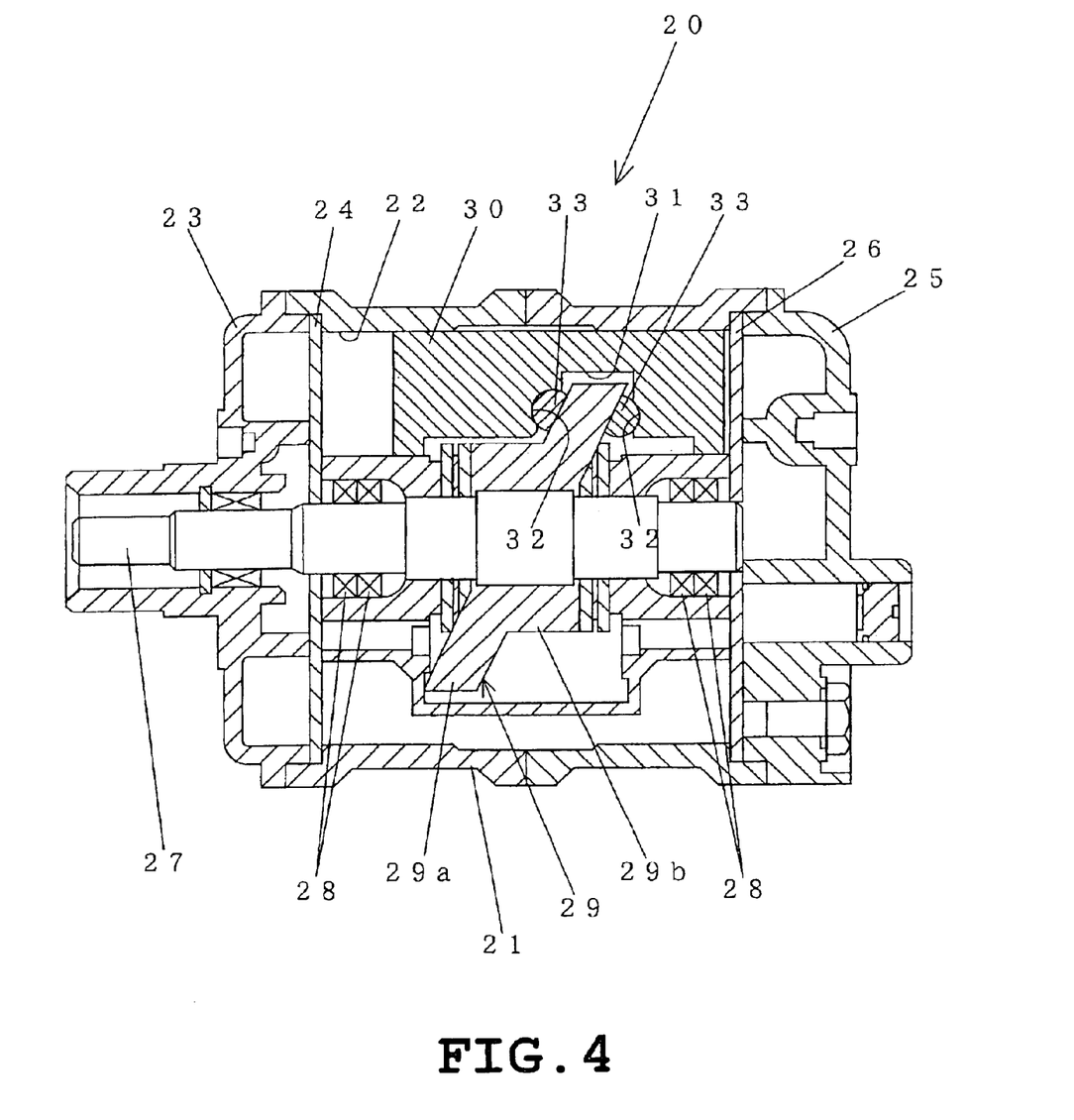
FIG. 4 is a longitudinal sectional view schematically showing a swash plate type compressor in which the thrust bearing embodying the invention is used.

Then, as an example of the case where the double-sided sliding thrust bearing 1 is used, a swash plate type compressor 20 is described below with reference to FIG. 4. FIG. 4 is a longitudinal sectional view schematically showing the swash plate type compressor 20.

The swash plate type compressor 20 compresses a gas in a cylinder 22 by a piston 30 reciprocating in the cylinder 22 following a swash plate 29 rotating in the swash plate type compressor 20. In FIG. 4, the contour of the swash plate type compressor 20 is defined by a cylinder block 21 constituting the outer peripheral portion thereof, a front cylinder head 23 constituting the front side (left-hand side in the drawing) thereof, and a rear cylinder head 25 constituting the rear side (right-hand side in the drawing) thereof. Between the cylinder block 21 and the front cylinder head 23 is held a valve plate 24, and between the cylinder block 21 and the rear cylinder head 25 is held another valve plate 26. A part of the space surrounded by the valve plates 24 and 26 and the cylinder block 21 is provided as the cylinders 22. Each of the cylinders 22 is made to have a cylindrical shape, and the cylinders are located at an equal angular interval about a later-described rotating shaft 27. In each of the cylinders 22, a piston 30 reciprocating in the cylinder 22 is inserted. The piston 30 is made to have a columnar shape, and is provided therein with a swash plate insertion portion 31 in which the swash plate 29 is inserted. On the side wall of the swash plate insertion portion 31, shoe mounting portions 32 are provided to freely rotatably support a shoe 33 in sliding contact with the swash plate 29.

In the center of the swash plate type compressor 20, the rotating shaft 27 rotated by a driving source (not shown) is rotatably supported by bearings 28. In a substantially central portion of the rotating shaft 27, the swash plate 29, which is a member to which the present invention is applied, is mounted by attaching pins (not shown). The swash plate 29 comprises a boss portion 29b located in the center of the swash plate 29 and a sliding portion 29a in sliding contact with the shoes 33. The boss portion 29b is made to have a substantially cylindrical shape, and the sliding portion 29a has such a shape as a cylinder is cut obliquely. The sliding portion 29a is inclined with respect to the axis of the boss portion 29b, and the diameter thereof is larger than that of the boss portion 29b. This sliding portion 29a is made by any one of the above-described double-sided sliding thrust bearings 1 according to the first to third embodiments of the invention. Specifically, the sliding layer 10 is provided on each of both the faces thereof, and the counterparts, that is, the shoes 33 are in slidable contact with both the faces thereof.

In the state in which the swash plate 29 is incorporated in the swash plate type compressor 20, the sliding portion 29a is mounted to be inclined with respect to the axis of the rotating shaft 27, and a part of the sliding portion 29a is located in the cylinder 22. A part of the sliding portion 29a located in the cylinder 22 is inserted in the swash plate insertion portion 31 of the piston 30, and the shoes 33 are in contact with both faces of a part of the sliding portion 29a as described above. When the rotating shaft 27 is rotated by the driving force of the driving source in this state, the swash plate 29 is also rotated, and the piston 30 is reciprocated in the cylinder 22 following the rotation of the swash plate 29. Thus, a gas fed into the cylinder 22 by suction valves (not shown) provided on the valve plates 24 and 26 is compressed by the piston 30. The compressed gas is exhausted from the cylinder 22 by exhaust valves (not shown) provided on the valve plates 24 and 26.

When the piston 30 is reciprocated, the shoe 33 slides on the sliding portion 29a. At this time, the shoes 33 are rotatively moved in the shoe mounting portion 32, so that they are always slid while being in contact with the sliding portion 29a. Since the sliding portion 29a is made by any one of the double-sided sliding thrust bearings 1 according to the first to third embodiments as described above, the exposure of the base member 2 of the double-sided sliding thrust bearing 1 due to the wear of the sliding layer 10 and the peeling-off of the sliding layer from the base member are hardly caused even when the swash plate 29 of the swash plate type compressor 20 is rotated at a high speed or even when the swash plate 29 thereof is subjected to a high load. Also, the damage and breakage of the base member 2 and the temperature rise on the sliding faces can be prevented. Thus, the swash plate type compressor 20 can be used under a severe condition of high speed and high load etc.

Figure 5A:
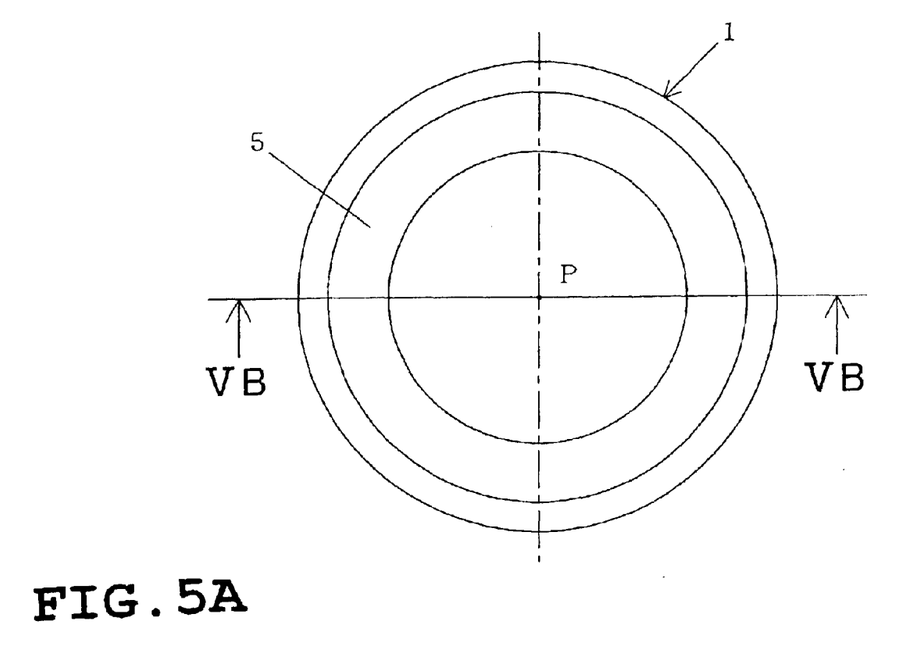
FIGS. 5A and 5B are a plan view and a longitudinal sectional view both schematically showing a double-sided sliding thrust bearing according to the fourth embodiment of the invention, respectively.
Figure 5B:
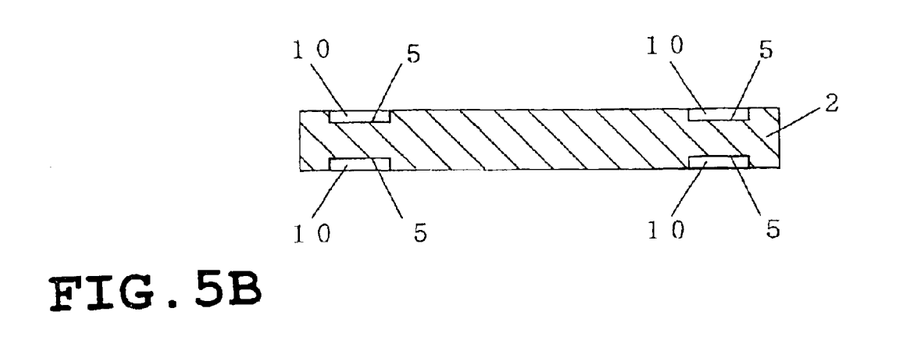
Figure 6A:
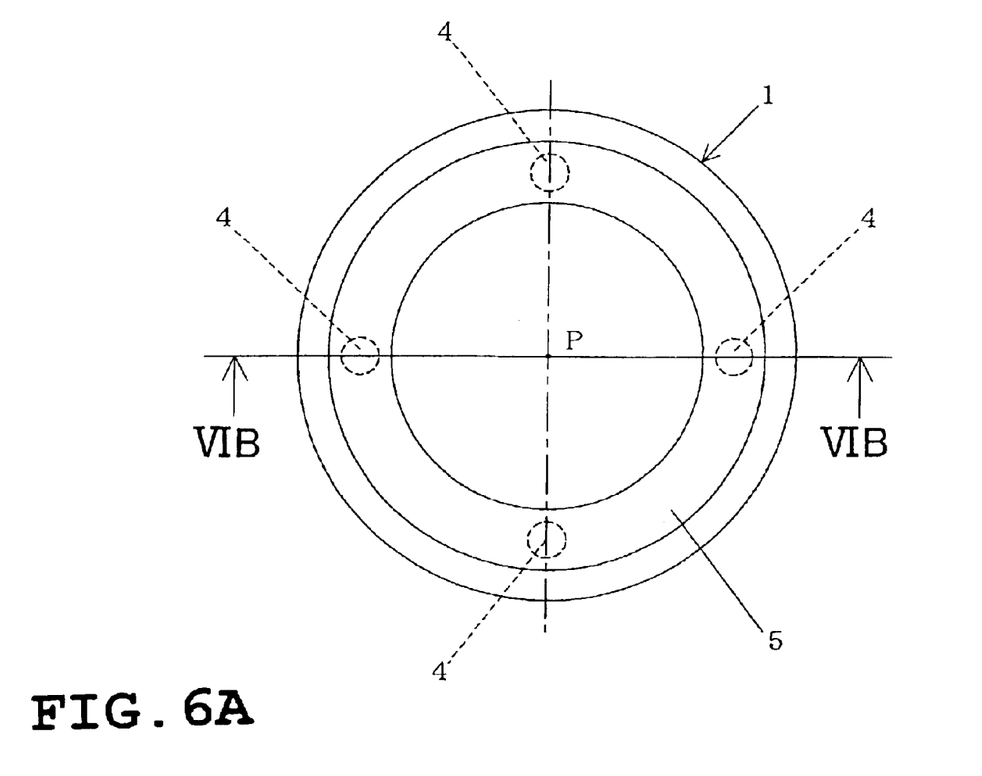
FIGS. 6A and 6B are a plan view and a longitudinal sectional view both schematically showing a double-sided sliding thrust bearing according to the fifth embodiment of the invention, respectively.
Figure 6B:
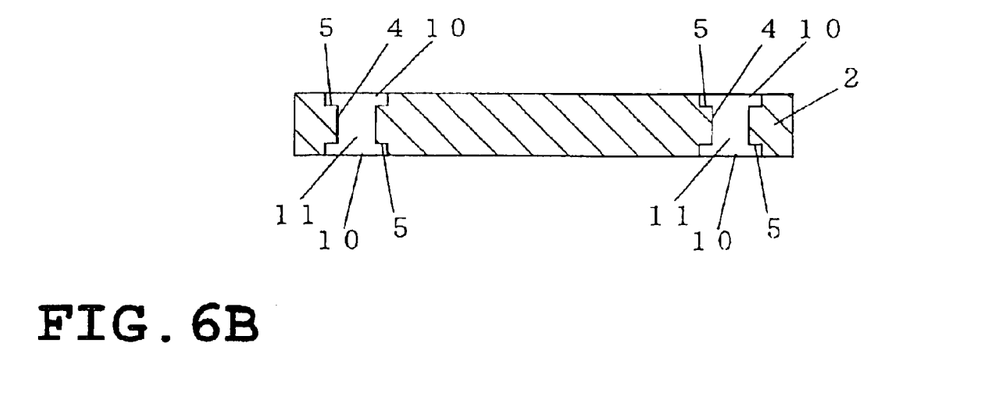
Figure 7A:
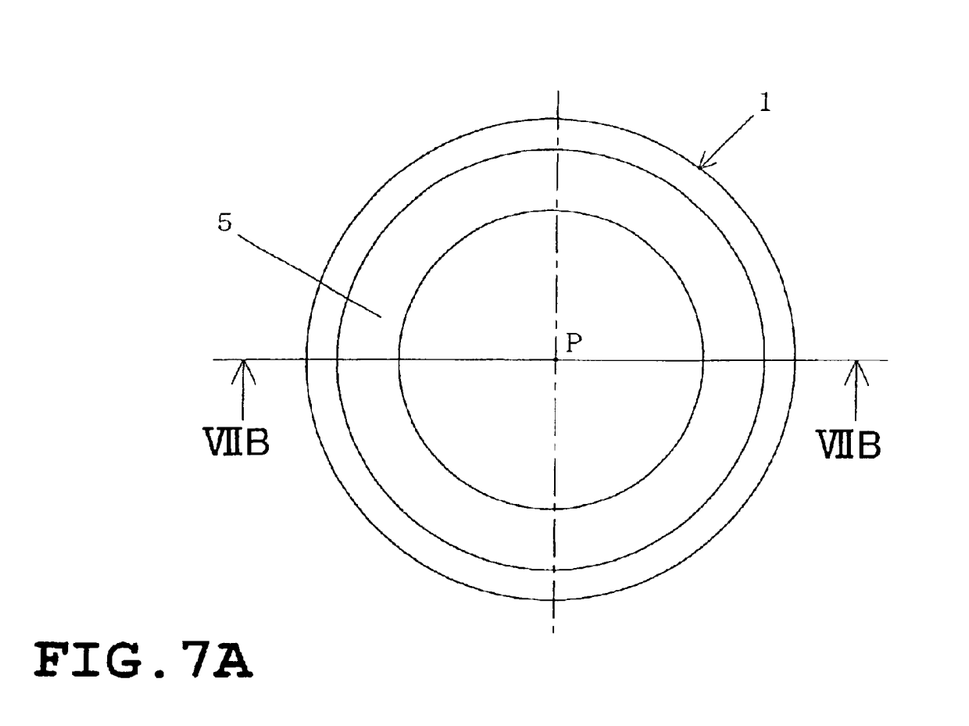
FIGS. 7A and 7B are a plan view and a longitudinal sectional view both schematically showing a double-sided sliding thrust bearing according to the sixth embodiment of the invention, respectively.
Figure 7B:
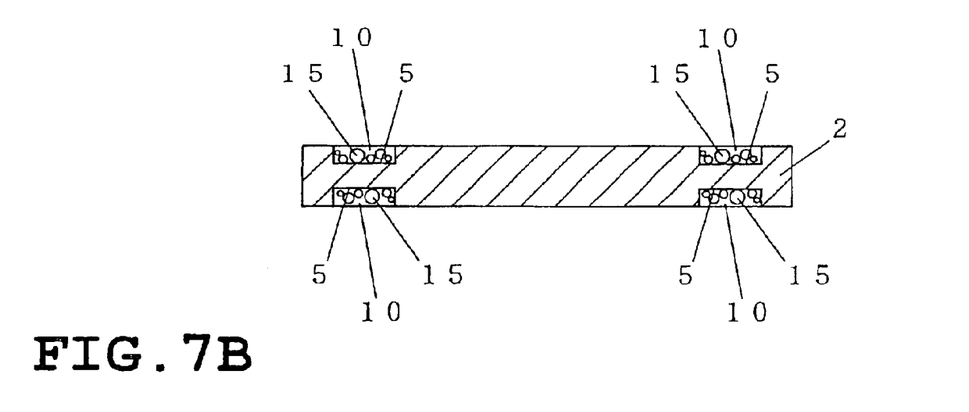

In the above-described swash plate type compressor 20, each of the shoes 33 is not necessarily contact with the whole face of the sliding portion 29a of the swash plate 29, and as shown in FIG. 4, there are portions which are not in contact with each of the shoes 33 on the outer and inner peripheral sides of the sliding portion 29a. Thus, the sliding layer 10 may be not necessarily provided on the whole face of the sliding portion 29a, but may be provided only in a portion which comes to be in contact with each of the shoes 33. Such embodiments are described below with reference to FIGS. 5 to 7. FIGS. 5A and 5B are a plan view and a longitudinal sectional view schematically showing a double-sided sliding thrust bearing 1 according to the fourth embodiment of the invention, respectively. FIGS. 6A and 6B are a plan view and a longitudinal sectional view schematically showing a double-sided sliding thrust bearing 1 according to the fifth embodiment of the invention, respectively. FIGS. 7A and 7B are a plan view and a longitudinal sectional view schematically showing a double-sided sliding thrust bearing 1 according to the sixth embodiment of the invention, respectively. The material for the base member 2 constituting the double-sided sliding thrust bearings 1 of the fourth to sixth embodiments and the resin component of the sliding layer 10 constituting the same are the same as those for the double-sided sliding thrust bearings 1 of the first to third embodiments. Also, the same reference numerals are applied to elements having the same functions as those in the double-sided sliding thrust bearings 1 of the first to third embodiments.

In FIGS. 5A and 5B, the base member 2 in the fourth embodiment has an annular concave portion 5 in each of both the faces thereof by pressing, cutting, or the like. When the sliding layer 10 is provided in each of the annular concave portion 5 thus formed, the sliding layer 10 fits in each of the annular concave portions 5, so that a resistance to a stress in the sliding direction increases, which brings about an anchor effect. Therefore, the adhesion is increased by the anchor effect, and hence the sliding layer 10 is hardly peeled off from the base member 2. In this case, a bonding layer may be provided on the bottom face and inside faces of each of the annular concave portions 5 by using an adhesive etc. By bonding the sliding layer 10 to each of the annular concave portions 5 by the bonding layer in this manner, the sliding layer 10 can be made to be further hardly peeled off from the base member 2.

In the base member 2 in the fifth embodiment shown in FIGS. 6A and 6B, an annular concave portion 5 is provided in each of both the faces thereof, and a plurality of (four in the drawing) through holes 4 are provided at an equal interval concentrically about the center P of the base member 2 by means of pressing or cutting or other means. Each of the through holes 4 is provided so that the bottoms of the annular concave portions 5 in both the faces of the base member may be connected to each other. By providing the sliding layer 10 in the annular concave portions 5 thus formed, the sliding layers 10 fit in the annular concave portions 5 similarly to the case of the fourth embodiment, so that a resistance to a stress in the sliding direction increases, which make it possible to bring about an anchor effect. Thus, the adhesion is increased by the anchor effect, and the sliding layer 10 comes to be hardly peeled off from the base member 2. Further, similarly to the case of the second embodiment, the thermosetting resin-containing material is intruded in the through holes 4 to thereby provide connecting portions 11. Therefore, the sliding layers 10 provided in both the faces of the base member 2 are connected to each other by the connecting portions 11, which brings about an anchor effect. This anchor effect makes the sliding layers 10 hardly peeled off from the base member 2. By providing the through holes 4 at the equal interval concentrically about the center P of the base member 2 as described above, the anchor effect can be brought about uniformly over the whole surfaces of the sliding layers 10. Thus, the sliding layer 10 can be prevented from being peeled off locally. Although four through holes 4 are provided in FIG. 6, the number of the through holes is not limited to this, and two or more through holes 4 may be provided. As the number of the through holes 4 increases, the anchor effect rises.

In the base member 2 in the sixth embodiment shown in FIGS. 7A and 7B, an annular concave portion 5 is provided in each of both the faces thereof, and a porous layer 15 is provided on the bottom of each of the annular concave portions 5 similarly to the case of the third embodiment. By providing the porous layers 15 in this manner, the thermosetting resin-containing material for the sliding layer 10 is impregnated, when the sliding layer 10 is provided in the base member 2, in pores in the porous layers 15, which brings about an anchor effect. Thus, adhesion between the base member 2 and each of the sliding layers 10 is increased by this anchor effect, so that the sliding layer 10 comes to be hardly peeled off from the base member 2.

As described above, in the double-sided sliding thrust bearings 1 according to each of the fourth to sixth embodiments, the sliding layer 10 is provided only in the portion where each of the counterparts is in sliding contact with each of the sliding layers, so that the amount of the used resin material providing the sliding layer 10 can be reduced, and hence the cost can be lowered.

Incidentally, similarly to the case of the double-sided sliding thrust bearings 1 according to each of the first to third embodiments, the sliding layer 10 of the double-sided sliding thrust bearings 1 according to each of the fourth to sixth embodiments is provided by any one of the compression molding, the transfer molding, and the injection molding. The means for providing the sliding layer 10 is not limited to the above means, and each of the sliding layers 10 may be provided by the steps of preparing a preform having a predetermined shape corresponding to the sliding layer 10, and fitting it into the annular concave portion 5 so that it may be bonded to the annular concave portion 5. In this case, the sliding layer 10 is preferably made to have a thickness of 0.5 to 10 mm.

In FIGS. 5A to 7B, each of the annular concave portion 5 has a rectangular, axial cross section, however, the axial cross section thereof is not limited to the rectangle. For example, the axial cross-sectional shape of the circular concave portion 5 may be semicircular and etc.

Also, although the double-sided sliding thrust bearing 1 in each of the first to sixth embodiments is made to have a circular or annular shape, the shape is not limited to the circle or ring. That is, the shape of the double-sided sliding thrust bearing 1 may be changed in accordance with the application so that it may have, for example, an elliptical or square shape.

Also, the synthetic resin in the thermosetting resin-containing material used for the sliding layers 10 of the double-sided sliding thrust bearing 1 according to each of the first to sixth embodiments is the thermosetting resin, however, the resin is not limited to the thermosetting resin. That is, a heat-resistant thermoplastic resin such as polybenzimidazole (PBI) or the like may be used.

Further, although in each of the second and fifth embodiments each of the through holes 4 is provided in the base member 2 so that the sliding layers 10 on both the faces of the base member may be connected to each other, other constitution may be used. For example, the base member 2 may be made of a material such as an expanded metal or a wire netting in which material through holes are previously provided, whereby the sliding layers 10 provided on both the faces thereof can be connected to each other.

As described above, in the double-sided sliding thrust bearings 1 according to each of the embodiments, the sliding layer 10 of the thermosetting resin-containing material such as phenolic resin having a thickness of 30 to 500 μm is provided on each of both the faces of the plate-shaped base member 2 made of the metallic simple substance or alloy of iron or copper or aluminum. Thus, the simple substance of resin material consisting of the phenolic resin and the solid lubricant has, for example, a thermal conductivity of $3 \times 10^{-3}$ (cal/cm·sec·° C.), however, even iron, which has the lowest thermal conductivity among iron, copper and aluminum, has a thermal conductivity of 0.175 (cal/cm·sec·° C.). Thus, it becomes possible to produce the double-sided sliding thrust bearing 1 having a thermal conductivity higher than that of a double-sided sliding thrust bearing made of only a simple substance of resin.

Further, the simple substance of the resin material consisting of the phenolic resin and the solid lubricant has a bending strength of $8.8 \times 10^{-2}$ (MPa), however, even aluminum, whose deformation load is the lowest among iron, copper and aluminum, has a bending strength of 12 (MPa). Therefore, it becomes possible to produce the double-sided sliding thrust bearing 1 having a mechanical strength higher than that of a double-sided sliding thrust bearing made of only a simple substance of resin.

Next, regarding an inventive, double-sided sliding thrust bearing and conventional double-sided sliding thrust bearings, there were performed tests for evaluating the sliding characteristic of these double-sided sliding thrust bearings by use of a thrust type testing machine, the details of the tests and the result thereof being disclosed in Tables 2 to 5. In Table 2 are shown the conditions of test Nos. 1a and 1b in which the inventive product and conventional ones were tested in an oil (lubricant). The results of the tests Nos. 1a and 1b are shown in Table 3. In Table 4 are disclosed the conditions of other test (test No. 2) in which the inventive product and conventional ones were tested in the dry state. In Table 5 are shown the results of the test No. 2.

The constitution of the sliding layer regarding each of the inventive product and the comparative ones Nos. 1 to 4 according to the conventional technique is shown in each of Tables 3 and 5. Regarding these double-sided sliding thrust bearings, tests Nos. 1a, 1b and 2 different from each other were performed. In the test No. 1a was measured a specific seizure load at which a seizure occurs in the lubricant when a specific load of 3 MPa per 30 minutes is cumulatively applied to each of the tested bearings. In the test No. 1b, the amount of wear after the lapse of 4 hours was measured when each of the sliding thrust bearings was subjected to the specific load of 10 MPa at a speed of 0.01 m/sec. In the test No. 2 was measured the seizure time (, that is, a lapse of time until any seizure occurs in each of the tested bearings subjected to the test in the dry state) when a specific load of 0.015 MPa per one second was cumulatively applied thereto, and the kinds of the seizure were also examined in the test No. 2. These kinds of the seizure are shown in Tables 2 and 4.

In the tested bearings shown in Tables 3 and 5, the inventive product had a sliding layer 10 of 30 μm impregnated and coated on the porous layer 15 provided on the base member 2, the sliding layer being made of a phenolic resin containing the solid lubricant, that is, the tested, inventive product had the same constitution as that of the double-sided sliding thrust bearing 1 of the third embodiment. Also, comparative product No. 1 was one in which the sliding layer having a thickness of 5 μm was provided by coating the surface of base member with a polyamide-imide resin (hereinafter abbreviated to PAI) in which the solid lubricant was added. Comparative product No. 2 was a double-sided sliding thrust bearing in which the sliding layer with a thickness of 20 μm was provided by coating a plurality of times the surface of the base member with a mixture of PAI and the solid lubricant. Comparative product No. 3 was one in which the sliding layer with a thickness of 5 μm was provided by coating the surface of the base member with the mixture of PAI, the solid lubricant and the hard particles. Comparative product No. 4 was one which was made of a simple substance of a metal consisting of 10 mass % tin, 10 mass % lead, and the balance copper.

TABLE 2

Test Conditions of Test No. 1a

| | Test conditions | Unit |
|---|---|---|
| Speed | 2 | m/s |
| Specific load | Cumulative load applying of 3 MPa per 30 minutes | MPa |

TABLE 2-continued

Test Conditions of Test No. 1a

| | Test conditions | Unit |
|---|---|---|
| Lubricant | Kerosene | — |
| Method of lubrication | Bath of kerosene | — |
| Kind of shaft | JIS-S55C (hardened) | — |
| Roughness | Not more than 1 | Ry μm |

In this test, the seizure is judged to occur at the time when the temperature of the rear face of the tested product becomes 140° C. or when the torque for driving the shaft supported by the tested bearing product becomes 50 N·m.

Test Conditions of Test No. 1b

| | Test conditions | Unit |
|---|---|---|
| Speed | 0.01 | m/s |
| Specific load | 10 | MPa |
| Lubricant | Kerosene | — |
| Method of lubrication | Bath of kerosene | — |
| Kind of shaft | JJS-S55C (hardened) | — |
| Roughness | Not more than 1 | Ry μm |
| Time of test | 4 | hour |

TABLE 3

The results of tests Nos. 1a and 1b

| | Material | Specific seizure load (MPa) | Amount of wear (μm) |
|---|---|---|---|
| Inventive product No. 1 | PF + 40 vol. % graphite, 30 μm in thickness | 18 | Not more than 3 |
| Comparative product No. 1 | PAI + 40 vol. % MoS$_2$, 5 μm in thickness | 18 | Not more than 3 |
| Comparative product No. 2 | PAI + 40 vol. % MoS$_2$, 20 μm in thickness, coating of a plurality of times | 18 | Not more than 3 |
| Comparative product No. 3 | PAI + 40 vol. % MoS$_2$ + 1 vol. % Al$_2$O$_3$, 5 μm in thickness | 15 | Not more than 3 |
| Comparative product No. 4 | Cu- 10 mass % Sn- 10 mass % Pb (LBC-3) | 12 | 10 |

TABLE 4

Test Conditions of Test No. 2

| | Test conditions | Unit |
|---|---|---|
| Speed | 2 | m/s |
| Specific load | Cumulative load applying of 0.015 MPa per one second | MPa |
| Kind of shaft | JJS-555C(hardened) | — |
| Roughness | Not more than 1 | Ry μm |

In this test, the seizure is judged to occur at the time when the temperature of the rear face of the tested product becomes 140° C. or when the torque for driving the shaft supported by the tested bearing product becomes 50 N·m.

TABLE 5

The results of test No. 2

| | Material | Time of resisting the occurrence of seizure (sec.) | Phenomenon by which seizure is judged to occur |
|---|---|---|---|
| Inventive product No. 1 | PF + 40 vol. % graphite, 30 μm in thickness | 100 seconds | Exceeding the temperature of 140° C. |
| Comparative product No. 1 | PAI + 40 vol. % MoS$_2$, 5 μm in thickness | 80 seconds | Exceeding the torque of 50 N × m |
| Comparative product No. 2 | PAI + 40 vol. % MoS$_2$, 20 μm in thickness, coating of a plurality of times | 80 seconds | Exceeding the torque of 50 N × m |
| Comparative product No. 3 | PAI + 40 vol. % MoS$_2$ + 1 vol. % Al$_2$O$_3$, 5 μm in thickness | 70 seconds | Exceeding the torque of 50 N × m |
| Comparative product No. 4 | Cu- 10 mass % Sn- 10 mass % Pb (LBC-3) | 40 seconds | Exceeding the torque of 50 N × m |

In the test results of the test 1a which are shown in Table 3, the specific seizure load of the inventive product No. 1 is the same as that of each of the comparative product Nos. 1 and 2 and is larger than that of each of the comparative products Nos. 3 and 4, and particularly the specific seizure load of the inventive product No. 1 is remarkably larger than that of the comparative product No. 4. Also, in the results of the test No. 1b shown in Table 3, the specific seizure load of the inventive product No. 1 is equivalent to those of the comparative products Nos. 1 to 3 and is remarkably lower than that of the comparative product 4. Thus, regarding the sliding characteristic in the case where the lubricant is supplied, the inventive product No. 1 in which the sliding layer 10 is made to be thick in thickness reveals the value equivalent to or higher than those of the comparative products Nos. 1 and 3 (in which the sliding layer is made to be thin in thickness), the comparative product No. 2 (in which the sliding layer is made to be thick in thickness by repeating the coating with the resin) and the comparative product No. 4 (in which the product is made only of the simple substance of the metal).

Then, in the test results shown in Table 5, the time till the occurrence of the seizure regarding the inventive product No. 1 is 100 seconds which is longer than that of 40 to 80 seconds regarding the comparative products Nos. 1 to 4. Regarding the phenomenon of the seizure, the seizure of the inventive product No. 1 occurs due to the rise of the temperature in excess of 140° C., however, in the comparative products Nos. 1 to 4 the seizure occurs due to the rise of the torque in excess of 50 N·m. The reason why the seizure of the comparative products is due to the rise of the torque is considered to reside in the respect that the sliding layer was worn out due to the wear thereof caused by the sliding between the sliding layer and the counterpart with the results that the base member came to be exposed with the result that the sliding resistance was raised between the counterpart and the base member. Thus, as shown in Table 5, the sliding layer comes to be worn out in a period of 70 to 80 seconds with the result that the base member is exposed, causing the seizure. In the comparative product No. 2, although the sliding layer is made to be thick by repeating a plurality of times the coating with the synthetic resin mixture, the sliding layer comes to be locally peeled off immediately after the start of the test. This is because the solid lubricant added to the resin layer comes to be coagulated locally, which decreases the adhesion thereof. The peeling-off thereof is apt to occur particularly between the layers provided by repeating the coating.

In the comparative product No. 4, since the sliding occurs between the metallic, simple substance of LBC-3 and the counterpart, the sliding resistance is inherently high, so that the seizure thereof occurred in a short time of 40 seconds. On the other hand, the seizure of the inventive product No. 1 due to the rise of temperature is caused by the temperature rise of the back face thereof before the sliding layer 10 is worn out, so that it becomes possible for the counterpart to slide for 100 seconds before the occurrence of the seizure. Thus, by forming the sliding layer 10 to have the sufficient thickness to prevent the sliding layer 10 from being worn out and to prevent the base member 2 from being exposed, it becomes possible for the counterpart to slide for a long time even in the dry state.

Incidentally, the inventive product No. 1 had a constitution in which the sliding layer 10 is provided by impregnating the synthetic resin in the porous layer 15 provided on the base member 2, that is, the constitution is the same as that of the third embodiment. However, regarding the constitution of each of the first, second, fourth, fifth and sixth embodiments, a good test result similar to that of the inventive product No. 1 was obtained.

As apparent from the above description, in the first aspect of the invention, it becomes possible, by making the thickness of the sliding layer not less than 30 $\mu$m, to produce the double-sided sliding thrust bearing which can make the counterpart slide for a longer period of time even in the case where the double-sided sliding thrust bearing is used in the dry state, and which bearing can make the sliding layer hardly peeled off from the base member because of the anchor effect of the base member. Further, since the mechanical strength and thermal conductivity of the double-sided sliding thrust bearing can be improved by the base member located between both of the sliding layers, it can be used at a high load because of the high strength, and a temperature rise on sliding face can be minimized by the heat-dissipating effect brought about by the high thermal conductivity thereof.

In the second aspect of the invention, it becomes possible to readily produce, by merely providing the concave portion in each of both the faces of the base member by pressing or other means, the base member having the anchor effect which makes the sliding layer hardly peeled off. This anchor effect is brought about by the fact that the sliding layer fits in the concave portion provided in each of both the faces of the base member, whereby a resistance against a stress in the sliding direction is increased. The anchor effect makes the adhesion high between the base member and the sliding layer, so that the sliding layer come to be hardly peeled off from the base member.

In the third aspect of the invention, it becomes possible to readily produce, by merely providing the through holes at positions distant from the center of the base member at an equal angular interval, the base member having the anchor effect which makes the sliding layer hardly peeled off. This anchor effect is brought about by the fact that the sliding layers formed on both the faces of the base member are connected to each other by the through holes provided in the base member. The anchor effect makes the adhesion high between the base member and the sliding layer, so that the sliding layer comes to be hardly peeled off from the base member.

In the fourth aspect of the invention, it becomes possible to produce, by merely providing the porous layer on each of both the faces of the base member, the base member having the anchor effect which makes the sliding layer hardly peeled off. This anchor effect is brought about by the fact that the thermosetting resin-containing material for the sliding layer is impregnated in the porous layer provided on each of both the faces of the base member. The anchor effect makes the adhesion high between the base member and the sliding layer high, so that the sliding layer comes to be hardly peeled off from the base member.

In the fifth aspect of the invention, it becomes possible to produce the sliding layer with the sufficient thickness, so that the double-sided sliding thrust bearing which makes the counterparts slide for a longer time even in the case where it is in the dry state can be manufactured readily.

In the sixth aspect of the invention, it becomes possible to make the counterpart slide for a longer period of time even in the case where the double-sided sliding thrust bearing is used in the dry state, so that it becomes possible to prevent the base member from being damaged or from being broken while minimizing the temperature rise thereof. Thus, the swash plate type piston pump of the invention can be used under a severe condition of no lubrication, a high speed, a high load and etc.

What is claimed is:

1. A double-sided sliding thrust bearing of a plate shape adapted to be in sliding contact with a counterpart on each of both faces of the thrust bearing, comprising a bearing structure provided with:

a plate-shaped base member having an anchor effect on each of both faces thereof; and a sliding layer having a thickness not less than 30 $\mu$m on each of the faces of said base member which sliding layer is made of a thermosetting resin-containing material, wherein said anchor effect is brought about by a porous layer provided on each of both faces of said base member.

2. A double-sided sliding thrust bearing according to claim 1, wherein said thrust bearing is used as a swash plate provided in a swash plate type piston pump, said swash plate being rotated and acting as a sliding member so that a part of each of both faces of said swash plate is in sliding contact with a counterpart provided in said swash plate type piston pump.

3. A double-sided sliding thrust bearing according to claim 1, wherein said sliding layer is provided by any one of a compression molding, a transfer molding, and an injection molding.

4. A double-sided sliding thrust bearing according to claim 3, wherein said thrust bearing is used as a swash plate provided in a swash plate type piston pump, said swash plate being rotated and acting as a sliding member so that a part of each of both faces of said swash plate being in sliding contact with a counterpart provided in said swash plate type piston pump.

5. A double-sided sliding thrust bearing according to claim 1, wherein said anchor effect is brought about by a concave portion provided in each of the faces of said base member.

6. A double-sided sliding thrust bearing according to claim 5, wherein said thrust bearing is used as a swash plate provided in a swash plate type piston pump, said swash plate being rotated and acting as a sliding member so that a part of each of both faces of said swash plate being in sliding contact with a counterpart provided in said swash plate type piston pump.

7. A double-sided sliding thrust bearing according to claim 5, wherein said sliding layer is provided by any one of a compression molding, a transfer molding, and an injection molding.

8. A double-sided sliding thrust bearing according to claim 7, wherein said thrust bearing is used as a swash plate provided in a swash plate type piston pump, said swash plate being rotated and acting as a sliding member so that a part of each of both faces of said swash plate being in sliding contact with a counterpart provided in said swash plate type piston pump.

* * * * *